Nov. 23, 1965
N. BOHONOS ET AL  3,219,530
PORFIROMYCIN ANTIBIOTIC AND PRODUCTION THEREOF
Filed May 3, 1961
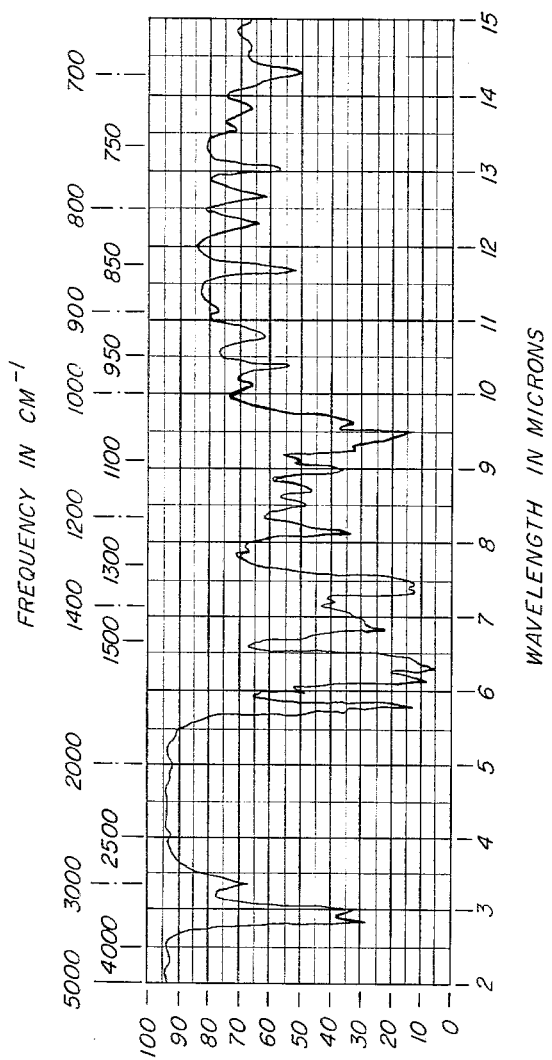
INVENTORS.
NESTOR BOHONOS
MURRAY DANN
WERNER KARL HAUSMANN
VALDIMIR ZBINOVSKY
EDWARD JAMES BACKUS
BY
ATTORNEY

United States Patent Office 3,219,530
Patented Nov. 23, 1965

3,219,530
PORFIROMYCIN ANTIBIOTIC AND
PRODUCTION THEREOF
Nestor Bohonos, Nanuet, and Murray Dann, Pearl River, N.Y., Werner Karl Hausmann, Woodcliff Lake, N.J., and Vladimir Zbinovsky, Nanuet, and Edward James Backus, Pearl River, N.Y., assignors to American Cyanamid Company, New York, N.Y., a corporation of Maine
Filed May 3, 1961, Ser. No. 107,572
4 Claims. (Cl. 167—65)

This application is a continuation-in-part of our copending application Serial No. 840,001, filed September 15, 1959, now abandoned.

This invention relates to a new antibiotic and to its production by fermentation, to methods for its recovery and concentration from crude solutions, and to processes for its purification.

The present invention includes within its scope the antibiotic in dilute forms, as crude concentrates, and in pure crystalline forms. These novel products are active against a variety of microorganisms including gram-positive and gram-negative bacteria. The effects of the new antibiotic on specific microorganisms together with the chemical and physical properties of the antibiotic differentiate it from previously described antibiotics.

The new antibiotic called porfiromycin (formerly designated $\gamma_2$) is formed during the cultivation under controlled conditions by certain new strains of the microorganism *Streptomyces verticillatus*.

The strains of *Streptomyces verticillatus* used in producing the antibiotic of the present invention belong to the taxonomic sub-grouping of the Streptomyces genus commonly referred to as the "whorled forms" because of the manner in which the sporiferous branches arise in verticillate fashion at nodes along the aerial hyphae. This character together with the olive-buff color of the spores en masse dictate the placing of this organism in the Olive-Buff series of the Biverticillus section, according to the division of the genus into sections and series as set forth by Pridham et al. in Applied Microbiology 6:52–79, 1958.

For simplicity in the specification the new strains will be referred to as AB–929, AA–849 and AB–286. Viable cultures of these strains of *Streptomyces verticillatus* have been deposited with the American Type Culture Collection, Washington, D.C. where they have been assigned ATCC accession numbers 13,495, 13,538 and 13,539, respectively. The following is a general description of the microorganism *Streptomyces verticillatus* strain AB–929 based on the diagnostic characteristics observed. The italicized descriptive colors are those of Ridgway—"Color Standards and Color Nomenclature."

*Amount of growth.*—Growth moderate to good on most media, spreading broadly on cornsteep liquor agar; poor growth on Czapek's, Czapek's-mannitol and nutrient agars.

*Aerial mycelium and/or en masse spore color.*—Spores en masse *Deep Olive-Buff*. Aerial mycelium whitish, sometimes tinted grayish from traces of sporulation.

*Soluble pigments.*—None.

*Reverse color.*—In shades of light brown on most media, becoming darker on nutrient, Bennett's, Sabouraud's and Cobalt-Amidex agars.

*Morphology.*—Aerial mycelium velvety with vegetative filaments simple and sparingly branched. Sporophores arising as biverticillate whorls of spore chains on the straight aerial filaments. Spores smooth walled, cylindrical, 0.6–0.8$\mu$ x 1.9–2.5$\mu$, adhering in long chains, and breaking apart with difficulty.

*Temperature relations.*—Optimal range for growth and sporulation 28–37° C.

The following table shows the cultural characteristics of AB–929 when grown on several differential agar media in petri dishes for 14 days at 28° C.:

TABLE 1

*Streptomyces verticillatus* (AB–929)

| Medium | Amount of Growth | Aerial Mycelium and Spore Color | Soluble Pigment | Reverse Color | Remarks |
|---|---|---|---|---|---|
| Waksman's Starch Agar | Moderate; somewhat restricted. | Aerial mycelium whitish; en masse sporulation moderate, Deep Olive-Buff. | None | Colorless to Deep Olive-Buff. | Good hydrolysis. |
| Asparagine dextrose agar | Moderate; spreading | White aerial mycelium, Trace of grayish sporulation. | ---do | Clay Color | Limited colorless exudate. |
| Benedict's Agar | Moderate; somewhat restricted. | Aerial mycelium white; no sporulation. | ---do | ---do | Abundant colorless to yellowish exudate. |
| Synthetic Agar (Czapek's solution Agar). | Thin; restricted | ---do | ---do | Cream to white | |
| Emerson's Agar | Good; spreading | Aerial mycelium white; no sporulation. light grayish. | ---do | Clay Color | Limited colorless exudate. |
| Nutrient Agar | Light growth | Aerial nycelium whitish; sporulation light, grayish. | ---do | Natal Brown | Sectoring prominently. |
| Calcium malate Agar | Moderate; somewhat restricted. | Aerial mycelium white tinted with grayish from light sporulation. | ---do | Yellowish to Clay Color. | No clearing of malate. |
| Glucose Agar | Good, spreading | White aerial mycelium; trace of grayish sporulation. | ---do | Clay Color | |
| Krainsky's dextrose agar | Moderate | Whitish aerial mycelium; sporulation light; Light Grayish Olive to Deep Olive-Buff. | ---do | ---do | Limited colorless to yellowish exudate; thin, feathery margin. |
| Potato dextrose agar | ---do | White aerial mycelium; trace of grayish sporulation. | ---do | ---do | |
| Bennett's Agar | ---do | White aerial mycelium; trace of grayish to Deep Olive-Buff sporulation. | ---do | Natal Brown | Moderate colorless to yellowish exudate; thin, feathery margin. |
| Corn Steep Liquor Agar | Good, spreading broadly. | Colony surface characterized by heavy sporulation in Deep Olive-Buff shades. | ---do | Colorless to Deep Olive-Buff. | Sectoring prominently. |
| Sabouraud's Maltose Agar | Moderate; somewhat restricted. | White aerial mycelium; no sporulation. | ---do | Chestnut-Brown | |
| Cobalt-Amidex (Hickey & Tresner) Agar. | Good, spreading | White aerial mycelium, tinted with grayish from the light sporulation. | ---do | Blackish Brown | Moderate colorless to yellowish exudate; thin, feathery margin. |

TABLE 1—Continued

| Medium | Amount of Growth | Aerial Mycelium and Spore Color | Soluble Pigment | Reverse Color | Remarks |
|---|---|---|---|---|---|
| Yeast-Malt Agar (Yeast Extract Agar). | Moderate | Aerial mycelium whitish; no sporulation. | ___do___ | Clay Color | Colonies wrinkled. |
| Czapek's-Dox Mannitol Agar. | Sparse, thin | White; no sporulation | ___do___ | Colorless to white | |
| Inorganic Salts-Starch Agar. | Moderate; Restricted | Aerial mycelium Pale Olive-Buff to whitish, becoming Deep Olive-Buff in sporulating areas. Sporulation moderate. | ___do___ | Warm Buff | Limited colorless exudate. Colonies raised and irregular. |
| Carvajal's Oatmeal Agar | Good; Spreading | ___do___ | ___do___ | Cinnamon-Brown | Colonies sectoring prominently. |
| Tomato paste Oatmeal Agar. | ___do___ | Aerial mycelium White to Pale Olive-Buff. Very light sporulation. | ___do___ | _____do_____ | Colonies elevated and furrowed. |
| Tomato paste Agar | Moderate | Aerial growth whitish to Pale Olive-Buff. Very light sporulition. | ___do___ | Orange-Cinnamon | Very light colorless to yellowish exudate. |

Some further observation of miscellaneous physiological tests are summarized in the following table (14 days' growth at 28° C. except where otherwise noted):

TABLE 2

| Medium | Amount of Growth | Aerial Mycelium and Spore Color | Soluble Pigment | Reverse Color | Remarks |
|---|---|---|---|---|---|
| Peptone-Iron [2] Agar | Good | | | | $H_2S$ positive. |
| Gelatin-Agar (Tyrosinase Test). | ___do___ | | | | Tyrosinase positive. |
| Gelatin | ___do___ | | | | Partial liquefaction. |
| Potato Plugs | Heavy | Aerial mycelium white, tinted grayish from trace of sporulation. | Slight graying of potato. | | |
| Carrot Plug | Good | White aerial mycelium; no sporulation. | None | | |
| Litmus Milk | Moderate | White aerial growth; no sporulation. | Slight tan color in upper medium. | | No coagulation; partial peptonization; pH 6.6. |
| Cellulose [2] (filter paper in Czapek's Solution). | Slight Growth | | | | No cellulose decomposition. |

[1] 24 hours incubation.   [2] 21 days incubation.

There are four species in the olive buff series of Pridham et al. referred to above. These are differentiated from AB-929 as follows.

The first, *S. albireticuli*, differs from AB-929 in having spore masses in shades of *Pale Ochraceous-Salmon* to *Warm Buff*, and sporulation occurs readily on many media. Reference cultures of *S. albireticuli* show cultural deviations from AB-929, such as growth habit, reverse coloration, etc.

*Streptomyces caespitosus* is described as having aerial mycelium in yellowish to greenish shades on several media; also, on synthetic agar colony centers are elevated and caespitose, making this species distinguishable from AB-929. *S. Caespitosus* is further distinguishable from AB-929 by the smaller size of its spores, its lack of tyrosinase production, its greater capacity to liquefy gelatin and by its abundant production of soluble yellow-brown pigments on many media.

*Streptomyces eurocidicus* differs from AB-929 in its yellowish to brownish growth on several media, and in its lack of proteolytic action in gelatin and its failure to peptonize milk.

Neither a description nor a reference culture of *Streptomyces olivoverticillatus* is available for comparison; however, synonymy of AB-929 with this organism can be ruled out for the following reasons. When AB-929 is compared with a published description of *Streptomyces verticillatus* (placed in the undifferentiated series of section Biverticillus by Pridham et al.), close correspondence is found in their diagnostic features. This would preclude the possibility of synonymy of our isolate with *S. olivoverticillatus*, since the latter would have to differ significantly from *S. verticillatus* in order to be a valid species, and thereby would of necessity, be different from AB-929. If *S. verticillatus* and *S. olivoverticillatus* were synonymous, the latter name would be illegitimate and the former binomial would have priority, because according to the International Code of Nomenclature of Bacteria and Viruses, the oldest legitimate name takes preference. In the present instance, *S. verticillatus* was erected in 1938, while *S. olivoverticillatus* was named in 1956.

It is to be understood that for the production of the antibiotic of this invention the present invention is not limited to the use of the cultures AB-929, AA-849 and AB-286 or to organisms fully answering the above growth and microscopic characteristics which are given for illustrative purposes. In fact, it is desired and intended to include the use of mutants produced from the described organisms by various means such as x-radiation, ultraviolet radition, nitrogen mustard, phage exposure and the like.

The fermentation process

The process by which the new antibiotic is produced is preferably an aerobic fermentation of an aqueous nutrient medium inoculated with the new strains described above. The constituents of the fermentation medium and the conditions of the fermentation are generally those of other fermentation processes in which fungi are employed to produce antibiotics.

The nutrient medium contains an assimilable source of carbon such as starch, sugar, molasses, glycerol, etc., an assimilable source of nitrogen such as corn steep liquor and inorganic cations such as potassium, sodium, calcium, etc., and anions like sulfate, phosphate, chloride, etc. Trace elements such as boron, molybdenum, copper, etc. are supplied as needed in the form of impurities by the other constituents of the medium. Aeration in tanks and bottles is provided by forcing sterile air through or onto the surface of the fermenting medium.

Shaker flask fermentation

The culture AB-929 is carried at 28° C. on a yeast-malt agar slant of the following composition:

|  | G./l. |
|---|---|
| Yeast extract | 4 |
| Malt extract | 10 |
| Glucose | 4 |
| Agar | 20 |

The pH is adjusted to 7.0 with KOH. The transfers are made directly from the slants to the inoculum medium of the following composition:

|  | G./l. |
|---|---|
| Soybean meal | 20 |
| Corn steep liquor | 5 |
| Glucose | 20 |
| $CaCO_3$ | 3 |

One hundred milliliters of the above medium are transferred to a 500 milliliter Erlenmeyer flask, sterilized, inoculated with spore-mycelia transfer from a week old agar slant, and shaken for 48 hours at 28° C. on a reciprocating shaker (2 inch stroke, 104 cycles per minute). The final mash is used to inoculate the shaker flask fermentation medium which has the following composition:

|  | G./l. |
|---|---|
| Corn steep liquor | 12.5 |
| Corn starch | 10.0 |
| $(NH_4)_2SO_4$ | 5.0 |
| Citric acid | 2.0 |
| $(NH_4)_2HPO_4$ | 2.0 |
| NaCl | 2.0 |
| $KH_2PO_4$ | 1.5 |
| $K_2HPO_4$ | 0.5 |
| $MgSO_4 \cdot 7H_2O$ | 0.25 |

The pH is adjusted to 7.0 with NaOH. Fifty milliliters of this medium are transferred to a 250 milliliter Erlenmeyer flask, sterilized, inoculated and shaken four days at 28° C. on a rotary shaker at 240 r.p.m. Samples are periodically taken, centrifuged and stored at 4° C. until assayed by the cup-plate technique. Inhibition zones of the following diameters have been obtained: 24.2 mm. for a 1:256 dilution on *B. subtilis*, pH 6, 20.5 mm. for a 1:64 dilution on *Strep. pyogenes haemolyticus* and 21.3 mm. for a 1:128 dilution on *Mycobacterium* No. 607.

Tank fermentation

The inoculum is prepared in the following manner. An agar slant of the culture is incubated for a week. At this time, the spores and mycelium are transferred to two 500 milliliter flasks containing 100 milliliters of the inoculum medium described earlier. The flasks are then shaken on a reciprocating shaker for 48 hours. The contents are transferred to a bottle containing 6 liters of inoculum medium and aerated for 24 hours at 28° C. to encourage further growth. The resulting mash is used to inoculate a tank containing the fermentation medium mentioned previously.

The temperature for tank fermentation is 20-35° C., usually 28° C. Aeration is provided by forcing sterile air through or onto the surface of the mash (0.2-2.0, usually 1, liters of air per liter of mesh per minute). Further agitation is provided by a mechanical impeller (120-160 r.p.m.). An anti-foam agent such as 1% octadecanol in lard oil is added as needed. The fermentation time varies from 72 to 140 hours.

Purification procedure

After the fermentation is completed, the culture broth containing the antibiotic is filtered at the harvest pH of 6-7 to remove the mycelium from the broth. Diatomaceous earth or any of the conventional filtration aids may be used to assist the filtration which is carried out using standard equipment. Thereafter the antibiotic may be recovered from the filtrate by appropriate extraction procedures.

The antibiotic of this invention may be extracted from the filtrate with solvents such as ethyl acetate, chloroform, n-butanol, etc. at pH 5 to 7 and the extract is concentrated with addition of 0.1 M phosphate buffer pH 6.5.

The aqueous concentrate is first extracted with carbon tetrachloride, petroleum ether or hexane to remove impurities, then with chloroform, ethyl acetate or n-butanol which extracts the activity. The chloroform extract is concentrated and may be used for partition chromatography on diatomaceous earth. The developing solvent system may be a mixture of benzene, methanol and phosphate buffer pH 6.5 (20:1:1 by volume). The purple $\gamma_2$ fraction obtained may be rechromatographed on silicic acid with the solvent system benzene, ethyl acetate, methanol and phosphate buffer pH 6.5 (15:5:1:1 by volume). The purple effluent band is concentrated and crystallized from a mixture of ethyl acetate and petroleum ether.

The novel antibiotic of this invention is composed of the elements carbon, hydrogen, nitrogen and oxygen. The antibiotic has the following elemental analysis in percent: carbon, 55.2; hydrogen, 5.9; nitrogen, 16.0 and oxygen, 22.6; O-alkyl, 4.1 as methyl; N-alkyl, 3.7 as methyl; C-alkyl, 3.1 methyl; active hydrogen, 0.99. These analytical values establish the empirical formula:

$$C_{16}H_{20}N_4O_5$$

The molecular weight by X-ray diffraction is 351±10. The antibiotic has a melting point of 202–204° C. The product has an optical rotation of $[\alpha]_D^{25°} = +242°$ (±100°) (c., 0.045% in absolute methanol). A methanolic solution of the product has maxima in the ultraviolet and visible regions at 216 m$\mu$ ($E_{1cm.}^{1\%}$=665), 358 m$\mu$ ($E_{1cm.}^{1\%}$=638), and 550 m$\mu$ ($E_{1cm.}^{1\%}$=6.5)

An infrared absorption spectrum of the antibiotic was prepared in a standard manner by mixing with crystals of KBr and pressing into a disc. The compound exhibits characteristics absorption in the infrared region of the spectrum at the following wave lengths expressed in microns: 2.90, 3.00, 3.26, 3.39, 5.84, 6.02, 6.18, 6.32, 6.74, 6.88, 7.03, 7.10, 7.24, 7.37, 7.49, 7.94, 8.16, 8.53, 8.72, 9.01, 9.16, 9.28, 9.49, 9.63, 9.81, 10.15, 10.40, 10.77, 11.12, 11.69, 12.32, 12.69, 13.07, 13.58, 13.84, 14.33, and 14.65. The infrared curve is shown in the accompanying drawing.

The antibiotic shows the following R$f$ values in the solvent systems indicated below. The organism used for the bioautography was *B. subtilis*.

| R$f$ value of $\gamma_2$: | Solvent system |
|---|---|
| 0.1 | Benzene, methanol, water (1:1:2 by volume). |
| 0.6 | Benzene, isoayml alcohol, water (4:1:2 by volume). |
| 0.3 | 1,2-dichloroethane, carbon tetrachloride, acetic acid, water (4:4:1:2 by volume). |

The in vitro antimicrobial activity of the antibiotic was determined in a standard manner. The activity values shown in the table below correspond to the width (in mm.) of the zones of inhibition around the agar well of an agar cup diffusion assay. A concentration of 5 micrograms per milliliter was employed.

TABLE 3

| Organism: | Zones of inhibition in mm. |
|---|---|
| Bacillus cereus | 3.0 |
| Klebsiella pneumoniae (Friedlanders) | 6.0 |
| Alcaligenes ATCC 10153 | 0 |
| Hormodendrum cladosporoides | 0 |
| Bacillus subtilis Led. #17 | 10.9 |
| | *14.9 |
| Bacillus subtilis Led. #18 | 4.0 |
| Mycobacterium #607 | >19.0 |
| | *>15.0 |
| Staphylococcus aureus Led. #27 | 6.0 |
| Klebsiella pneumoniae | sl. |
| Escherichia coli Led. #29 | 0 |
| Escherichia coli Led. # 30 | 0 |
| Streptococcus pyogenes NY-5 | 12.0 |
| Staphylococcus aureus ATCC 6538 | 7.5 |
| Corynebacterium xerose NRRL B1397 | 11.3 |
| Erwinia amylovora | 6.0 |
| Salmonella gallinarum #605 | 0 |
| Pasteurella multocida | 5.0 |
| Staphylococcus aureus Smith Strain | 10.1 |
| Klebsiella pneumoniae "A" Strain AD | sl. |
| Candida albicans Strain CA300 | 0 |

*pH 6 agar.

The new antibiotic is highly active in vitro against selected strains of gram-negative and gram-positive bacteria and mammalian cells.

In vivo the new antibiotic has been found to be effective against mammary adenocarcinoma 72j in mice.

In vivo it is as effective as some of the other commonly used antibiotics such as tetracycline in protecting mice infected with Staphylococcus Smith. The novel antibiotic is also effective against *Leptospira pomona* in chick embryos. The novel antibiotic is also effective against pleuro-pneumonia-like organisms referred to usually as PPLO and known to be one of the etiological agents which causes the very serious chronic respiratory disease of poultry.

The novel antibiotic of this invention is also particularly useful in protecting chickens against infections with *Pasteurella multocida*. This organism is the etiological agent responsible for fowl cholera.

In tests involving the infection of one-week old Hallcross sex-linked cockerels by intracoelomic injection of 0.5 milliliter of a 1/1000 dilution of an 18 hour culture of *Pasteurella multocida*, followed by intracoelomic injection a half-hour later of the novel antibiotic at a dosage of 25 mg./kg., 19 out of 20 animals survived of the total number of animals treated. With the infected controls, however, none of the animals survived.

The new antibiotic has not as yet been demonstrated to be useful in human therapy.

The invention will be described in greater detail in conjunction with the following specific examples.

*Example 1.—Fermentation of culture AB–929 (ATCC No. 13,495)*

Four 500 milliliter flasks of inoculum were prepared as described under inoculum preparation. These inoculum flasks were used to "seed" two 20 liter bottles containing 12 liters each of fermentation medium. The fermentation medium was that previously described except it did not contain ammonium sulfate. The medium before inoculation was sterilized by procedures well known by those skilled in the art. The fermentation conditions were as follows:

| | |
|---|---|
| Agitation | Impeller speed 400 r.p.m. |
| Aeration | 0.03 c.f.m. |
| Temperature | 26° C. to 28° C. |

The fermentation was allowed to proceed for 46.5 hours at which time the bottles were harvested and the broth assayed.

*Example 2.—Tank fermentation of AB–929*

Two 500 milliliter flasks containing 100 milliliters each of medium and one 9 liter bottle containing 6 liters of medium were inoculated and prepared as described previously under inoculum preparations. This inoculum was used to "seed" a 200 gallon tank containing 500 liters of fermentation medium. The tank medium was sterilized for 60 minutes at 120° C. before inoculation.

The fermentation conditions were as follows:

| | |
|---|---|
| Temperature | 28° C. |
| Aeration | 1.0 liter of air/liter of mash/minute. |
| Agitation | Impeller speed 130 r.p.m. |
| Antifoam | Hodag oil (an antifoam agent manufactured by Hodag Chemical Corporation, Skokie, Illinois). |

The initial pH of the fermentation broth was 7.0, and the fermentation was allowed to continue for 73½ hours at which time the mash was harvested. The harvest mash, pH 6.4, was bioassayed against *B. subtilis* and *Streptococcus pyogenes*.

*Example 3.—Isolation of a purified preparation of the antibiotic*

The mash (1500 liters) was aerated from harvest right up to the moment of filtration in order to prevent the destruction of the activity. The pH of the mash was 6–7. Filtration was carried out with the addition of diatomaceous earth (36 kilograms). The filtrate (1200 liters) was counter-currently extracted in a Luwesta extractor with ethyl acetate (1000 liters) and the extract was concentrated to 300 milliliters. The precipitate which formed was removed by filtration and the filtrate made up to 500 milliliters with ethyl acetate. This solution (250 milliliters) was concentrated to a heavy syrup. Sea sand (600 grams) and diatomaceous earth (120 grams) were intimately mixed with the syrup. The mixture was extracted five times with water at pH 5 (5 x 700 milliliters). The aqueous phase was adjusted to pH 6.5 and lipoid materials were extracted with hexane (twice with ⅕ volume). The aqueous phase was then extracted with ethyl acetate (3 times ½ volume). The ethyl acetate extract was concentrated almost to dryness in vacuo at 30° C. and extracted with water. This aqueous extract was lyophilized (16.5 grams) and one-fourth was used as charge for the first partition chromatographic column.

*Example 4.—Isolation of a purified preparation of the antibiotic modified procedure*

The aerated mash was filtered at harvest pH 6–7 and the mycelium discarded. The beer was extracted with ethyl acetate; phosphate buffer of pH 6.5 was added to the extract. Ethyl acetate was removed, leaving an aqueous phase. Lipoid material was extracted with petroleum ether. The aqueous phase was extracted with chloroform, buffer of pH 6.5 was added to the extract which was then evaporated to dryness and used as charge for a Celite column.

*Example 5.—Isolation in crystalline form and characterization of the antibiotic*

Material (5.5 grams) prepared by the method of Example 3 was chromatographed on a Celite column (900 grams) by development with a system containing benzene, methanol and phosphate buffer pH 6.5 (20:1:1 by volume). The purple-blue band obtained was evaporated to dryness at 35° C. under vacuum. The residue was dissolved in lower phase (21 milliliters) of the system benzene, ethyl acetate, methanol, aqueous phosphate buffer pH 6 (8:2:1:1 by volume) and thoroughly mixed with silicic acid (30 grams). This charge was fractionated on a silicic acid column (150 grams) with the upper phase of the above solvent system. The purple band obtained was evaporated to dryness and dissolved in ethyl acetate.

Upon addition of Skellysolve B dark blue needles (480 milligrams) were obtained. Upon recrystallization from ethyl acetate-petroleum ether, the yield of crystalline antibiotic was 410 milligrams. The chemical analysis of this product and its other chemical, physical and biological properties have already been described.

*Example 6*

The procedure of Examples 2 and 5 were repeated using the organism ATCC No. 13,538 (AA–849). The compound obtained was the same as in Example 5.

*Example 7*

The procedure of Example 1 was followed using the organism ATCC No. 13,539 (AB–286). The product was subjected to chromatographic examination and was the same as produced in Example 5.

The antibiotic of the present invention is distinguishable from other red-purple-blue antibiotics shown in the following table:

graphic R$f$ numbers of 0.1 in the system benzene, methanol, water (1:1:2 by volume), of 0.6 in the system benzene, isoamyl alcohol, water (4:2:1 by volume) and 0.3 in the system 1,2-dichloroethane, carbon tetrachloride, acetic acid, water (4:4:1:2 by volume).

2. The antibiotic porfiromycin as set forth in claim 1 in its essentially pure form.

3. A substance effective in inhibiting the growth of gram-positive and gram-negative bacteria, said substance crystallizing in dark purple needles, melting at 202–204° C., which contains the elements carbon, hydrogen, nitrogen, and oxygen in substantially the following percentages by weight:

Carbon ........................................ 55.2
Hydrogen ...................................... 5.9
Nitrogen ...................................... 16.0
Oxygen ........................................ 22.6 having an optical rotation $[\alpha]_D^{25°} = +242°$ ($\pm 100°$) (c., 0.045 percent in methanol), a methanolic solution of said

TABLE 4

| Antibiotic | m$\mu$ UV max. | M.P., °C. | M.W. | Indicator | Remarks |
| --- | --- | --- | --- | --- | --- |
| Actinoflocin | 230, 270 | | | | |
| Actinomycins | | | ~1,000 | | Chromopeptides. |
| Actinorhodin | 285, 523, 531, 571 | 270 | 575 | Yes | Contains no N. |
| Bostrycoidin | 251, 320 | 243–244 | 342 | | Insol. in H$_2$O. |
| Coelicolorin | | 142–146 | | Yes | H$_2$O insol. below pH 8, green at pH 8. |
| Cyanomycin | 240, 278, 384 (0.1 N HCl) | 128 | 250 | Yes | C$_{15}$H$_{12}$N$_2$O$_2$. |
| Isorhodomycin | 240, 310, 551, 563, 610 | 220 | 460 | | C$_{20-21}$H$_{26-31}$O$_8$N.HCl. |
| Iodinin | | 236 | | No | Insol. in alcohol and H$_2$O. An acid produced by bacterium. |
| Javanicin | 303, 505 in ethanol | | | Yes | No N; produced by fungus. |
| Lactaroviolin | 242, 314, 398, 527 in EtOH | 53 | | | Do. |
| Litmocidin | | 144–146 | | Yes | Insol. in H$_2$O. Inact. against Staph. in mice. |
| Mycorhodin | 258, 420, 471 | 200–202 | 635–698 | Yes | 2% N. |
| Microcin A | | | | | Insoluble in H$_2$O. |
| Mitomycin A | 215, 318, 530 | 159–161 | | Yes | Separated by paper chromatography; IR E1% 1 cm. |
| Mitomycin B | 220, 320, 550 | 182–184 | | Yes | Do. |
| Mitomycin C | 216, 360, 560 | >360 | 1,120 | Yes | Do. |
| Pluramycin B | | | | | Insol. H$_2$O. |
| Prodigiosin | 225, 288, 337, 471, 539 (EtOH pH 7.4). | 70–80 | 390 | Yes | Insol. in H$_2$O; C$_{20}$H$_{25}$ON$_3$. |
| Pyocyanine | | 130 (d.) | | | Insol. in benzene; C$_{13}$H$_{10}$ON$_2$. Produced by bacterium. |
| Ractinomycin | 245, 440–450 | None | 692 | | C$_{33}$H$_{30}$N$_3$O$_{14}$. |
| Rhodocidin | 515 | | | | Differentiated by distribution coefficients. |
| Rhodomycetin | 235, 520, 540, 580 | >300 | | Yes | Inactive to Staph. in mice; insol. in H$_2$O. |
| Rhodomycins | A: 498, 532, 566 / B: 496, 530 | A: 193 / B: 180 | 420 | Yes | Separated by paper chromatography. |
| Rubidin | 500, 530 (HCl) / 400, 520 (NaOH) | | | Yes | No N, stable in acid. |
| Rubromycin | 546, 584 (NaOH) / 518–520 (H$_2$SO$_4$) | 215 (d.) | | | Insol. in H$_2$O; No N. |
| Spinulosin | | 201–203 | 184 | Yes | No opt. rot.; no N; produced by fungus. Insol. cold H$_2$O. |

We claim:

1. A substance effective in inhibiting the growth of gram-positive and gram-negative bacteria, said substance crystallizing in dark purple needles, melting at 202–204° C., having the following composition in percent on elemental analysis: carbon, 55.2, hydrogen, 5.9, nitrogen, 16.0, oxygen, 22.6, the said analytical values establishing the empirical formula C$_{16}$H$_{20}$N$_4$O$_5$, said substance having a molecular weight of 351±10, having an optical rotation $[\alpha]_D^{25°} = +242°$ ($\pm 100°$) (c., 0.045 percent in methanol), a methanolic solution of said substance having maxima in the ultraviolet and visible regions of the spectrum at 216 m$\mu$ ($E^{1\%}_{1\text{cm.}} = 665$), 358 m$\mu$ ($E^{1\%}_{1\text{cm.}} = 638$) and 550 m$\mu$ ($E^{1\%}_{1\text{cm.}} = 6.5$)

said substance when suspended in a potassium bromide pellet exhibiting characteristic absorption in the infrared region of the spectrum at the following wavelengths expressed in microns: 2.90, 3.00, 3.26, 3.39, 5.84, 6.02, 6.18, 6.32, 6.74, 6.88, 7.03, 7.10, 7.24, 7.37, 7.49, 7.94, 8.16, 8.53, 8.72, 9.01, 9.16, 9.28, 9.49, 9.63, 9.81, 10.15, 10.40, 10.77, 11.12, 11.69, 12.32, 12.69, 13.07, 13.58, 13.84, 14.33 and 14.65, and said substance having chromato- substance having maxima in the ultraviolet and visible regions of the spectrum at 216 m$\mu$, 358 m$\mu$ and 550 m$\mu$, said substance exhibiting characteristic absorption in the infrared region of the spectrum as shown in FIG. 1 and having chromatographic R$f$ numbers of 0.1 in the system benzene, methanol, water (1:1:2 by volume), 0.6 in the system benzene, isoamyl alcohol, water (4:2:1 by volume) and 0.3 in the system 1,2-dichloroethane, carbon tetrachloride, acetic acid, water (4:4:1:2 by volume), said substance being in crystalline form.

4. A process for the production of porfiromycin which comprises cultivating a porfiromycin-producing organism selected from the group consisting of *Streptomyces verticillatus* ATCC No. 13,495, *Streptomyces verticillatus* ATCC No. 13,538 and *Streptomyces verticillatus* ATCC No. 13,539, in an aqueous nutrient medium containing assimilable sources of carbohydrate, nitrogen and inorganic salts under submerged aerobic conditions until substantial anti-bacterial activity is imparted to said medium.

No references cited.

JULIAN S. LEVITT, *Primary Examiner.*

MORRIS O. WOLK, IRVING MARCUS, *Examiners.*